United States Patent Office 3,640,950
Patented Feb. 8, 1972

3,640,950
HALOGENATED RESINS STABILIZED WITH NOVEL COMPOSITIONS
Lewis B. Weisfeld, Highland Park, N.J., assignor to Cincinnati Milacron Chemicals Inc., Reading, Ohio
No Drawing. Continuation-in-part of application Ser. No. 577,844, Sept. 8, 1966. This application Feb. 27, 1969, Ser. No. 803,084
Int. Cl. C08f 45/62
U.S. Cl. 260—45.75 K           13 Claims

ABSTRACT OF THE DISCLOSURE

The early color stability of halogenated resins stabilized with diorganotin mercapto compounds is improved by including a minor amount of monohydrocarbyltin derivatives therewith. This combination also frequently reduces processing and finish odors associated with mercapto stabilizers.

---

This invention relates to halogenated resin compositions stabilized with organotin mercapto compounds. More particularly, this invention relates to a combination of a dialkyltin mercapto compound and a monohydrocarbyltin compound to stabilize halogenated resins with improved early color properties and often a reduction of processing and finished odors.

This application is a continuation-in-part of my application Ser. No. 577,844 filed Sept. 8, 1966, now abandoned.

Diorganotin mercapto compounds have gained acceptance as useful stabilizers for halogenated resins. Their use has been extended by so called hidden benefits in addition to their stabilizing properties. These hidden benefits include such things as permitting longer, uninterrupted extrusion runs with less down time needed for cleaning and changing of screen packs. Also, these stabilizers often demonstrate a slight though significant increase in the output rate of high quality extrusions. However, halogenated resin formulations stabilized with diorganotin mercapto compounds sometime exhibit an undesirable yellowish cast and an unpleasant odor is developed during processing. The unpleasant odor, in addition, frequently remains noticeable in the finished product. The characteristic yellow color and unpleasant odor present in diorganotin mercapto compound stabilized halogenated resins has limited expansion of the use of these resins to new applications.

I have discovered that the yellowish cast characteristic of diorganotin mercapto compound stabilized halogenated resins can be substantially eliminated by including small amounts of monohydrocarbyltin compounds in the resin formulations. This combination often has the additional advantage of substantially eliminating the unpleasant odors released during processing of such resin formulations as well as the residual odor heretofore found in the finished product. The additional advantage is particularly noticeable when at least one tin-oxygen bond is present in the monohydrocarbyltin compound.

The diorganotin mercapto compounds, particularly the dialkyltin mercapto compounds, which have found wide acceptance as stabilizer compositions include the reaction products of mercapto acids, mercapto esters and mercaptides with diorganotin compounds. For example, products defined by the formulae (a) $R^1R^2Sn(SR^3COOR^4)_2$

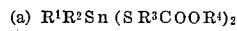
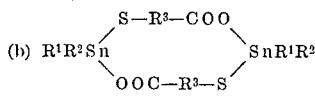

(b) $R^1R^2Sn\begin{matrix}S-R^3-COO\\OOC-R^3-S\end{matrix}SnR^1R^2$ (c) $R^1R^2Sn(SR^4)_2$ wherein $R^1$ and $R^2$ are monovalent alkyl, aryl, aralkyl, alkaryl, or cycloalkyl radicals, $R^3$ is a substituted or unsubstituted alkylene, arylene, aralkylene, alkarylene or cycloalkylidene and $R^4$ represents hydrogen or monovalent alkyl, aryl, aralkyl, alkaryl, or cycloalkyl are well known. Compounds of the Formula 1(a) may be prepared, for example, by the reaction of 1 mole of a diorgantin oxide with 2 moles of a mercapto ester. The reaction of equal molar amounts of a diorganotin oxide and a mercapto acid will produce compounds corresponding to that of Formula 1(b). The reaction of a diorganotin oxide with 2 moles of a mercaptide produces a compound corresponding to that of Formula 1(c).

At present, dibutyltin bis (isooctyl acetomercaptide) and dibutyltin bis (dodecyl mercaptide) are probably the most common organotin mercapto stabilizers. They provide very good long-term static heat stability and low melt viscosity which are necessary for the processing of halogen-containing resins and particularly rigid polyvinyl chloride. Other diorganotin mercapto compounds which are suitable include dibutyltin bis (isooctyl beta mercapto propionate), dioctyltin bis (isooctyl mercapto propionate), dimethyltin bis (isooctyl acetomercaptide). Additional examples of suitable diorganotin mercapto compounds which may be used for stabilizing haolgen-containing resin compositions and practicing the present invention are taught by U.S. Pat. Nos. 2,809,956, 2,998,441 and 3,027,350 all to Mack et al. as well as U.S. Pat. No. 3,167,527 to Hechenbleikner and U.S. Pat. No. 3,183,238 to Barbanson.

The monoorganotin compounds suitable for practicing the present invention correspond to the formula (2)(a)           $R^1Sn(Z)_n(Z^1Y)_{3-2n}$ wherein $R^1$ has the same meaning as above, Z and $Z^1$ are each oxygen or sulfur, $n$ is 0 to 1½ and Y is hydrogen or a monovalent organic rest.

Examples of organic rests suitable include alkyl or cycloalkyl groups, carboxylic esters, such as —$R^3COOR^4$, carbonyl containing groups such as

and sulfur containing groups

wherein R is alkylene, alkenylene, cycloalkylidene, arylene and aralkylene, $R^4$ is hydrogen, alkyl or cycloalkyl and $R^5$ is alkylene, cycloalkylidene, alkylidene, alkenylene, or alkenylidene. Since the essential of these compounds is the mono-hydrocarbyl radical attached to the tin, many different organic rests may be used as Y.

When Z and $Z^1$ are both oxygen, $n$ is one and Y is $R^4$, the compounds are hydrocarbyl stannoic acids or esters thereof represented by the formula:

(b)           $R^1SnOOR^4$ wherein $R^4$ is hydrogen or alkyl. Examples of suitable compounds included within this formula when $R^4$ is hydrogen, are methyl stannoic acid, butyl stannoic acid, n-octyl stannoic acid, isooctyl stannoic acid and phenyl stannoic acid. Z and $Z^1$ may be sulfur and suitable compounds include the thiostannoic acids such as methyl thiostannoic acid, butyl thiostannoic acid, n-octyl thiostannoic acid, isooctyl thiostannoic acid and phenyl thiostannoic acid. When $n$ is 1½, the acids and/or thioacids correspond in part to the following formula:

(c)           $[R^1SnZ]_2Z$

These compounds are, for example, the dehydrated or desulfhydrated forms of the corresponding acids. Also, the monohydrocarbyltin compounds suitable for practicing the present invention may be mixtures of compounds represented by Formulae 2(b) and (c) such as when dehydration or desulfhydration is not complete. When $R^4$ is a hydrocarbon in Formula 2(b) the compounds are esters. Preferably, the $R^4$ hydrocarbons are alkyl groups having 1 to 12 carbon atoms such as the methyl, butyl, n-octyl and isooctyl esters of the above-listed acids and thioacids.

When $Z^1$ is sulfur, Y is a carboxylic ester, such as $R^3COOR^4$ and $n$ is zero, the compounds correspond to the formula:

(d) $R^1Sn(SR^3COOR^4)_3$

Examples of compounds corresponding to this formula which are suitable for practicing the present invention include monobutyltin tris(isooctylmercaptopropionate) and monobutyltin tris(isooctylthioglycolate).

When $Z^1$ is sulfur, Y is $R^3COOR^4$ and $n$ is ½, the compounds correspond to the formula:

(e) $[R^1Sn(SR^3COOR^4)_2]Z$

Examples of compounds suitable for practicing the present invention corresponding to this formula are bis(monobutyltin isooctylmercaptopropionate) oxide and bis(monobutyltin isooctylmercaptobutyrate) oxide. Also, if $n$ is changed to 1 the compounds of 2(e) become polymeric and have repeat units corresponding to the formula:

(f)  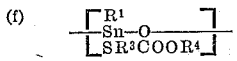

When $R^4$ is hydrogen, the compounds represented by Formula 2(b) frequently exist in the form of polymers which are the condensation products of the respective stannoic and thiostannoic acids and mixtures thereof. These condensation products may contain 2 to 1,000 repeat units and generally contain 2 to 100 repeat units corresponding to the formula:

(g) $[R^1SnZ_{1.5}]_y$ wherein Z in oxygen, sulfur or a mixture of oxygen and sulfur and $y$ denotes the degree of polymerization. Furthermore, other monobutyltin compounds also exist polymerically. One example is poly[butyl stannoxy cyclohexylidene bis(thiopropionate)].

Examples of compounds containing a carbonyl group in the Y-organic rest bonded to $Z^1$ are monobutyltin tris[butyrate], bis[monobutyltin dibutyrate] oxide and monobutyltin tris[cyclohexylidene bis(thiopropionic acid) monobutyl ester]. The latter compound is also exemplary of sulfur containing organic rests. Also unsaturated organic rests such as those containing

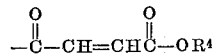

are useful. Suitable compounds containing unsaturated organic rests are monobutyltin tris(butylmaleate) and bis[di(monobutyltin) maleate] oxide.

The combination of compounds of the type corresponding to Formula 1(a–c) with those corresponding to the Formula 2(a) may be substituted with advantage in all applications where compounds corresponding to the Formula 1(a–c) have been heretofore employed. The combination of the present invention is particularly useful for improved halogen-containing resin compositions. The improvement of the present invention has found special application in the preparation of vinyl halide polymers, such as, polyvinyl chloride, copolymers of polyvinyl chloride with other ethylenically unsaturated compounds as well as other halogen-containing resins. The combination of the present invention may be used alone or further combined with other stabilizers such as epoxy compounds and/or organic phosphites.

The monohydrocarbyltin compounds of the present invention are incorporated into the resin compositions in amounts of about 0.1 to 25 weight percent of the dialkyl mercapto compound. Generally, 0.1 to 10 weight percent of the monohydrocarbyltin compound is sufficient to eliminate the yellowish cast produced in halogen-containing resins by dialkyltin mercapto stabilizers. The total amount of dialkyltin mercapto compound and monohydrocarbyltin compound used to stabilize halogen-containing resins usually ranges from about 0.2 to 10 weight percent of the resin and amounts of 0.5 to 2 weight percent are generally preferred.

The following examples are presented to illustrate the present invention and are not to be construed as limiting the scope thereof.

EXAMPLE 1

1 g. of butylstannoic acid was added to 100 g. of dibutyltin bis(isooctyl acetomercaptide), and the mixture was heated to 120° C. so as to dissolve the butylstannoic acid. Thereby, no substantial change of the physical properties of the dibutyltin compound was observed.

Two parts of said reaction mixture were milled at 320° F. for 5 minutes on a two-roll mill with 120 parts of rigid polyvinyl chloride homopolymer and 0.25 part of mineral oil, and then presspolished at the same temperature for 5 minutes into 20 mil sheets.

The obtained sheets were water-white and clear. Samples prepared in exactly the same manner with 2 parts of the dibutyltin bis(isooctyl acetomercaptide) only without the butylstannoic acid were also clear but had a distinct yellowish hue.

EXAMPLE 2

10 g. of bis(monobutyltin isooctyl mercaptopropionate) oxide were added to 100 g. of dibutyltin bis(isooctyl acetomercaptide) to form a homogenous mixture. When two parts of this mixture were milled into 100 parts of a vinyl chloride resin, which consisted of the copolymer of 85 percent by weight of vinyl chloride with 15 percent by weight of vinyl acetate and contained, in addition, 0.25 part of mineral oil under the conditions described in Example 1, the sheets were clear and practically colorless.

In addition, no unpleasant odor of mercapto acid was noticed on hot milling, and samples of thus obtained sheets stored in closed jars appeared odorless compared to the unpleasant smell presented by the sheets stabilized with the dibutyltin compound alone.

If two parts of the dibutyltin bis(isooctyl acetomercaptide) were used alone, omitting the monobutyltin compound, a significantly greater initial yellowness was observed. This difference is especially pronounced when the quantities of respective tin stabilizer compositions were reduced to a total of one part per hundred parts resin.

EXAMPLE 3

1.0 part of dibutyltin mercaptopropionate and 0.2 part of bis(monobutyltin isooctyl mercaptopropionate) oxide were hot milled with 0.25 part of mineral oil into 100 parts of poly(vinyl chloride) homopolymer. No objectionable mercapto acid odor was noticed.

When instead of the above mixture, 1.1 parts of the dibutyltin mercaptopropionate itself only were used, a very disagreeable odor was developed.

The (bis monobutyltin isooctyl mercaptopropionate) oxide used in the examples was prepared as follows:

208.7 g. (1.0 mole) of butylstannoic acid and 250 ml. of toluene were charged to a three-neck flask and dehydrated via azeotropic distillation at 120° C. under atmospheric pressure.

436.8 g. (2.0 moles) of isooctyl beta mercaptopropionate were added to the thus obtained product, and the reaction mixture was stripped by heating first for 30 minutes at a temperature of 120° C. and a pressure of 90 mm. Hg and then for additional 30 minutes at 155° C. and 15 mm. Hg.

A clear, slightly viscous straw-colored liquid was obtained, containing 18.0% Sn, and having the empirical formula

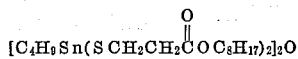

EXAMPLE 4

The procedure of Example 1 was followed except dimethyltin bis(isooctyl acetomercaptide) was substituted for the dibutyltin bis(isooctyl acetomercaptide). As in Example 1, the sheet containing both the monobutyltin and dimethyltin compounds were clear while those containing only the dimethyltin compound had a distinct yellowish hue.

EXAMPLE 5

Samples containing 100 parts of GEON 103EP and .5 part mineral oil were stabilized as follows:

(1) 1.00 part dibutyltin bis(isooctyl thioglycolate), (0.18 wt. percent Sn) [control sample]
(2) 0.97 part dibutyltin bis(isooctyl thioglycolate), 0.01 part monobutyl stannoic acid (0.18 wt. percent total Sn)
(3) 0.62 part dibutyltin bis(isooctyl thioglycolate), 0.13 part monobutyltin sulfide (0.18 wt. percent total tin)
(4) 1.24 parts dibutyltin bis(isooctyl mercaptopropionate), (0.18 wt. percent tin) [control sample]
(5) 0.98 part dibutyltin bis(isooctyl mercaptopropionate), 0.07 part monobutyl stannoic acid (0.18 wt. percent total tin)

These samples were milled and placed in an oven at 360° F. for 15 minutes. Samples 2, 3 and 5 remained water white and clear while control samples 1 and 4 developed a distinct yellowish cast.

EXAMPLE 6

Samples containing 100 parts of GEON 103EP and .5 part mineral oil were stabilized with the following:

(1) 2.5 parts dibutyltin bis(isooctyl thioglycolate)
(2) 2.18 parts dibutyltin bis(isooctyl thioglycolate,) 0.39 part monobutyltin tris(isooctyl thioglycolate)
(3) 2.28 parts dibutyltin bis(isooctyl thioglycolate), 0.40 part monobutyltin tris[cyclohexylidene bis (thiopropionic acid) monobutyl ester]

These samples were milled and placed in an oven at 370° F. for 45 minutes. Control sample 1 developed a distinct yellow hue while samples 2 and 3 stabilized according to the present invention remained water white and clear.

EXAMPLE 7

Samples containing 100 parts GEON 103EP and .5 part mineral oil were stabilized with the following:

(1) 2.52 parts dibutyltin bis(lauryl mercaptide)
(2) 2.21 parts dibutyltin bis(lauryl mercaptide), 0.39 part monobutyltin tris(isooctyl thioglycolate)
(3) 2.21 parts dibutyltin bis(lauryl mercaptide), 0.39 part monobutyltin tris[cyclohexylidene bis (thiopropionic acid) moonbutyl ester]

These samples were milled and placed in an oven at 370° F. for 15 minutes. Sample 1 developed a distinct yellow hue while samples 2 and 3 stabilized according to the present invention remained water white and clear.

EXAMPLE 8

Samples containing 100 parts of GEON 103EP and .5 part mineral oil were stabilized with the following:

(1) 1 part dibutyltin bis(isooctyl thioglycolate)
(2) .95 part dibutyltin bis(isooctyl thioglycolate) .05 part phenyl tin tris(isooctyl thioglycolate)
(3) .9 part dibutyltin bis(isooctyl thioglycolate), .1 part phenyl tin tris(isooctyl thioglycolate)

These samples were oven heated at 370° F. for 30 minutes at which time sample 1, the control sample, developed a distinct orange cast while samples 2 and 3 stabilized according to the present invention had only a very slight yellow hue.

What is claimed is:

1. A composition comprising a resin selected from the group consisting of polyvinyl chloride and copolymers thereof, a dialkyltin mercapto stabilizer having a formula selected from the group consisting of

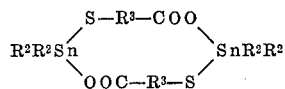

wherein $R^2$ is an alkyl radical having 1 to 12 carbons; $R^3$ is selected from the group consisting of alkylene, arylene, aralkylene, alkenylene and cycloalkylidene and $R^4$ is selected from the group consisting of hydrogen and alkyl and 0.1 to 25 weight percent of a monohydrocarbyltin compound based on said dialkyl mercapto stabilizer corresponding to the formula

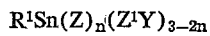

wherein $R^1$ is a radical having 1 to 12 carbons selected from the group consisting of alkyl and aryl, Z and $Z^1$ are each selected from the group consisting of oxygen and sulphur and Y is selected from the group consisting of hydrogen, alkyl having 1 to 12 carbons when $n$ is greater than zero and

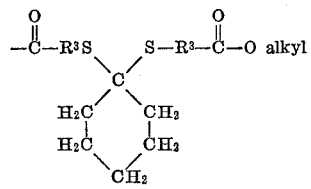

and $n$ is a value of zero to 1½ characterized by the absence of hindered phenols.

2. The composition of claim 1 wherein said dialkyltin mercapto stabilizer is selected from the group consisting of dibutyltin bis(isooctyl acetomercaptide), dibutyltin mercapto propionate, dioctyltin bis(isooctyl thioglycolate), dioctyltin bis(isooctyl mercaptopropionate) and dimethyltin bis (isooctyl acetomercaptide).

3. A resinous vinyl chloride composition containing as a stabilizer a dialkyltin salt of a compound selected from the group consisting of mercaptocarboxylic acids having 2 to 6 carbon atoms and alkyl esters of mercaptocarboxylic acids having 2 to 6 carbon atoms and 0.1 to 25 weight percent, calculated upon said salt, of a monoalkylstannoic acid wherein each said alkyl group has 2 to 12 carbon atoms characterized by the absence of hindered phenols.

4. The composition of claim 3 wherein said stabilizer is dibutyltin bis(isooctylacetomercaptide), and butylstannoic acid.

5. A composition comprising a resin selected from the group consisting of polyvinyl chloride and copolymers thereof, a dialkyltin mercapto stabilizer having a formula selected from the group consisting of

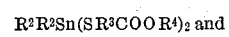

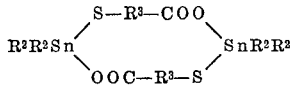

wherein $R^2$ is an alkyl radical having 1 to 12 carbons; $R^3$ is selected from the group consisting of alkylene, arylene, aralkylene, alkenylene, and cycloalkylidene and $R^4$ is selected from the group consisting of hydrogen and alkyl and 0.1 to 25 weight percent of a monohydrocarbyltin compound based on said dialkyl mercapto stabilizer corresponding to the formula $$RS_n(Z'Y)_3$$

wherein $R^1$ is a radical having 1 to 12 carbons selected from the group consisting of alkyl and aryl, $Z^1$ is selected from the group consisting of oxygen and sulfur, Y is selected from the group consisting of

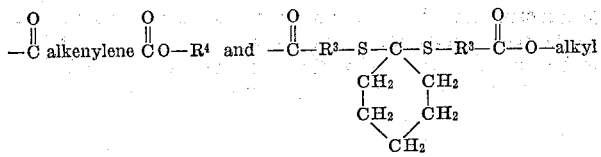

and, when $Z'$ is sulfur, Y is

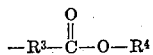

6. The composition of claim 5 wherein said dialkyltin mercapto stabilizer is selected from the group consisting of dibutyltin bis(isooctyl acetomercaptide), dibutyltin mercapto propionate, dioctyltin bis(isooctyl thioglycolate), dioctyltin bis (isooctyl mercaptopropionate) and dimethyltin bis (isooctyl acetomercaptide).

7. The composition of claim 6 wherein said monohydrocarbyltin compound is selected from the group consisting of monobutyltin tris(isooctyl mercaptopropionate), monobutyltin tris(isooctyl mercapto butyrate), monobutyltin tris(isooctyl thioglycolate), monobutyltin tris, and phenyltin tris (isooctyl thioglycolate).

8. A composition comprising a resin selected from the group consisting of polyvinyl chloride and copolymers thereof, a dialkyltin mercapto stabilizer having a formula selected from the group consisting of

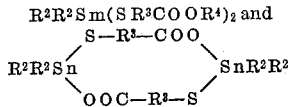

wherein $R^2$ is an alkyl radical having 1 to 12 carbons; $R^3$ is selected from the group consisting of alkylene, arylene, aralkylene, alkenylene, and cycloalkylidene and $R^4$ is selected from the group consisting of hydrogen and alkyl and 5 to 25 weight percent of a monohydrocarbyltin compound based on said dialkyl mercapto stabilizer corresponding to the formula $$R^1Sn(Z)_n(Z^1Y)_{3-2n}$$

wherein $R^1$ is a radical having 1 to 12 carbons selected from the group consisting of alkyl and aryl, Z and $Z^1$ are each selected from the group consisting of oxygen and sulphur and Y is selected from the group consisting of hydrogen, alkyl having 1 to 12 carbons when $n$ is greater than zero and

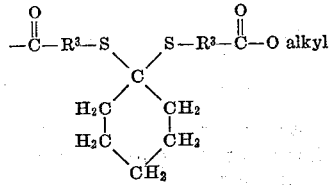

and $n$ is a value of zero to 1½ characterized by the absence of hindered phenols.

9. The composition of claim 8 wherein said monohydrocarbyltin compound is selected from the group consisting of methyl stannoic acid, butyl stannoic acid, butyl thiostannoic acid, n-octyl stannoic acid, n-octyl thiostannoic acid, isooctyl stannoic acid, isooctyl thio stannoic acid, phenyl stannoic acid, methyl-, butyl- and octyl esters of said acids.

10. A composition comprising a resin selected from the group consisting of polyvinyl chloride and copolymers thereof, a dialkyltin mercapto stabilizer having a formula selected from the group consisting of

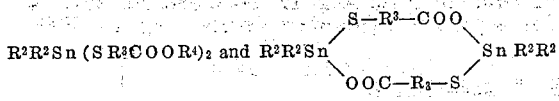

wherein $R^2$ is an alkyl radical having 1 to 12 carbons; $R^3$ is selected from the group consisting of alkylene, arylene, aralkylene, alkenylene, and cycloalkylidene and $R^4$ is selected from the group consisting of hydrogen and alkyl and 5 to 25 weight percent of a monohydrocarbyltin compound based on said dialkyl mercapto stabilizer corresponding to the formula $$R'S_n(Z'Y)_3$$

wherein $R^1$ is a radical having 1 to 12 carbons selected from the group consisting of alkyl and aryl, $Z^1$ is selected from the group consisting of oxygen and sulfur, Y is selected from the group consisting of

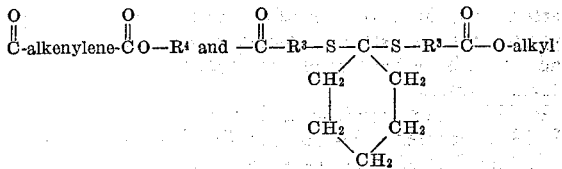

and, when $Z'$ is sulfur, Y is

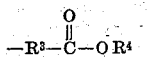

11. The composition of claim 10 wherein said dialkyltin mercapto stabilizer is selected from the group consisting of dibutyltin bis(isooctyl acetomercaptide), dibutyltin mercapto propionate, dioctyltin bis(isooctyl) thioglycolate), dioctyltin bis(isooctyl mercaptopropionate) and dimethyltin bis(isooctyl acetomercaptide).

12. The composition of claim 11 wherein said monohydrocarbyltin compound is selected from the group consisting of monobutyltin tris(isooctyl mercaptopropionate), monobutyltin tris(isooctyl mercapto butyrate), monobutyltin tris(isooctyl thioglycolate), monobutyltin tris, and phenyltin tris (isooctyl thioglycolate).

13. The composition of claim 12 wherein (a) is dibutyltin bis (isooctylacetomercaptide) and (b) is monobutyltin tris (isooctylthioglycolate).

References Cited

UNITED STATES PATENTS

| | | | |
|---|---|---|---|
| 2,641,588 | 6/1953 | Leistner | 260—45.75 |
| 2,789,963 | 4/1957 | Hecker | 260—45.75 |
| 3,021,302 | 2/1962 | Frey | 260—45.75 |
| 3,413,264 | 11/1968 | Hechenksleikner | 260—45.75 |

DONALD E. CZAJA, Primary Examiner

D. P. HOKE, Assistant Examiner

UNITED STATES PATENT OFFICE
CERTIFICATE OF CORRECTION

Patent No. 3,640,950　　　　　　　Dated February 8, 1972

Inventor(s) Lewis B. Weisfeld

It is certified that error appears in the above-identified patent and that said Letters Patent are hereby corrected as shown below:

Column 7, line 31, "tris," should read --tris[cyclohexylidene bis (thiopropionic acid) monobutyl ester],--, line 36, "$R^2R^2Sm(SR^3COOR^4)_2$" should read --$R^2R^2Sn(SR^3COOR^4)_2$--;

Column 8, line 52, "tris," should read --tris[cyclohexylidene bis (thiopropionic acid) monobutyl ester]--.

Signed and sealed this 19th day of February 1974.

(SEAL)
Attest:

EDWARD M. FLETCHER, JR.　　　　C. MARSHALL DANN
Attesting Officer　　　　　　　　Commissioner of Patents

REEXAMINATION CERTIFICATE (452nd)

United States Patent [19]

Weisfeld

[11] B1 3,640,950

[45] Certificate Issued * Feb. 11, 1986

[54] HALOGENATED RESINS STABILIZED WITH NOVEL COMPOSITIONS

[75] Inventor: Lewis B. Weisfeld, Highland Park, N.J.

[73] Assignee: Morton Thiokol, Inc., Chicago, Ill.

Reexamination Request:
No. 90/000,606, Aug. 10, 1984

Reexamination Certificate for:
Patent No.: 3,640,950
Issued: Feb. 8, 1972
Appl. No.: 803,084
Filed: Feb. 27, 1969

[ * ] Notice: The portion of the term of this patent subsequent to Feb. 9, 1989 has been disclaimed.

Certificate of Correction issued Feb. 19, 1974.

Related U.S. Application Data

[63] Continuation-in-part of Ser. No. 577,844, Sep. 8, 1966, abandoned.

[51] Int. Cl.$^4$ ............................................. C08K 5/58
[52] U.S. Cl. ................................. 524/181; 524/182

[58] Field of Search ..................... 524/180, 181, 182

[56] References Cited

U.S. PATENT DOCUMENTS

| | | | |
|---|---|---|---|
| 3,021,302 | 2/1962 | Frey | 524/181 |
| 3,534,121 | 10/1970 | Eggensperger | 524/181 |
| 3,640,947 | 2/1972 | Gloskey | 524/181 |
| 3,810,868 | 5/1974 | Weisfeld et al. | 524/180 |
| 3,887,519 | 6/1975 | Weisfeld et al. | 524/181 |

FOREIGN PATENT DOCUMENTS

| | | |
|---|---|---|
| 703471 | 2/1968 | Belgium . |
| 1529957 | 5/1968 | France . |
| 6707180 | 11/1967 | Netherlands . |

OTHER PUBLICATIONS

Klimsch, P. et al., "Synergistic Effects in the Stabilization of PVC with Organotin Compounds", Plaste und Kautschuk, vol. 16, No. 4 (1969) pp. 242–251.

*Primary Examiner*—Veronica P. Hoke

[57] ABSTRACT

The early color stability of halogenated resins stabilized with diorganotin mercapto compounds is improved by including a minor amount of monohydrocarbyltin derivatives therewith. This combination also frequently reduces processing and finish odors associated with mercapto stabilizers.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–13 are cancelled.

New claims 14–27 are added and determined to be patentable.

*14. A composition comprising a resin selected from the group consisting of polyvinyl chloride and copolymers thereof, a dialkyltin mercapto stabilizer selected from the group consisting of dibutyltin bis (isooctyl thioglycolate), dibutyltin bis (isooctyl mercaptopropionate), and dimethyltin bis (isooctyl thioglycolate) and 10 to 25 weight percent of a monohydrocarbyltin compound based on said dialkyl mercapto stabilizer selected from the group consisting of butylstannoic acid, bis (monobutyltin isooctyl mercaptopropionate) oxide, monobutyltin tris (isooctyl thioglycolate), and monobutyltin tris (isooctyl mercaptopropionate) characterized by the absence of hindered phenols.*

*15. A composition according to claim 14 wherein the dialkyltin mercapto stabilizer is dibutyltin bis (isooctyl thioglycolate) and the monohydrocarbyltin compound is butylstannoic acid.*

*16. A composition according to claim 14 wherein the dialkyltin mercapto stabilizer is dibutyltin bis (isooctyl thioglycolate) and the monohydrocarbyltin compound is bis (monobutyltin isooctyl mercaptopropionate) oxide and there is employed 10 weight percent of the monohydrocarbyltin compound based on said dialkyl mercapto stabilizer.*

*17. A composition comprising a resin selected from the group consisting of polyvinyl chloride and copolymers thereof, a dialkyltin mercapto stabilizer selected from the group consisting of dibutyltin bis (isooctyl thioglycolate), dibutyltin bis (isooctyl mercaptopropionate), and dimethyltin bis (isooctyl thioglycolate) and 10 to 25 weight percent of a monohydrocarbyltin compound based on said dialkyl mercapto stabilizer selected from the group consisting of monobutyltin tris (isooctyl thioglycolate) and monobutyltin tris (isooctyl mercaptopropionate).*

*18. A composition according to claim 17 wherein the dialkyltin mercapto stabilizer is dibutyltin bis (isooctyl thioglycolate) and the monohydrocarbyltin compound is monobutyltin tris (isooctyl thioglycolate).*

*19. A composition according to claim 18 wherein there is employed 25 weight percent of the monohydrocarbyltin compound based on said dialkyl mercapto stabilizer.*

*20. A composition according to claim 17 wherein the dialkyltin mercapto stabilizer is dibutyltin bis (isooctyl mercaptopropionate) and the monohydrocarbyltin compound is monobutyltin tris (isooctyl mercaptopropionate).*

*21. A composition according to claim 20 wherein there is employed 25 weight percent of the monohydrocarbyltin compound based on said dialkyl mercapto stabilizer.*

*22. A composition comprising a resin selected from the group consisting of polyvinyl chloride and copolymers thereof, dimethyltin bis (isooctyl thioglycolate) and 10 to 25 weight percent of a monohydrocarbyltin compound based on said dimethyltin bis (isooctyl thioglycolate) corresponding to the formula*

$$R^1 Sn(Z'Y)_3$$

*$R^1$ is an alkyl radical having 1 carbon atom and $Z'$ is sulfur and $Y$ is*

$$-R^3-\overset{O}{\underset{\|}{C}}-OR^4$$

*where $R^3$ is selected from the group consisting of alkylene, arylene, aralkylene, alkenylene, and cycloalkylidene and $R^4$ is selected from the group consisting of hydrogen and alkyl.*

*23. The composition of claim 22 where $R^4$ is alkyl.*

*24. The composition of claim 23 where $R^3$ is alkylene.*

*25. The composition of claim 22 wherein there is employed 25 weight percent of the monohydrocarbyltin compound based on said dimethyltin bis (isooctyl thioglycolate).*

*26. The composition of claim 25 where $R^4$ is alkyl.*

*27. The composition of claim 26 where $R^3$ is alkylene.*

* * * * *